United States Patent [19]
Morey et al.

[11] Patent Number: 5,007,705
[45] Date of Patent: Apr. 16, 1991

[54] VARIABLE OPTICAL FIBER BRAGG FILTER ARRANGEMENT

[75] Inventors: William W. Morey, West Hartford; Fred J. Leonberger, Glastonbury; William H. Glenn, Vernon; Gerald Meltz, Avon, all of Conn.

[73] Assignee: United Technologies Corporation, Hartford, Conn.

[21] Appl. No.: 456,449

[22] Filed: Dec. 26, 1989

[51] Int. Cl.⁵ .................................................. G02B 6/16
[52] U.S. Cl. ............................ 350/96.29; 350/96.15; 350/96.19
[58] Field of Search ............... 350/96.14, 96.15, 96.16, 350/96.19, 96.29, 96.30

[56] References Cited

U.S. PATENT DOCUMENTS

| | | | |
|---|---|---|---|
| 4,268,116 | 5/1981 | Schmadel et al. | 350/96.29 |
| 4,701,009 | 10/1987 | Tangonan et al. | 350/96.14 X |
| 4,725,110 | 2/1988 | Glenn et al. | 350/96.19 X |
| 4,737,007 | 4/1988 | Alferness et al. | 350/96.19 |
| 4,781,428 | 11/1988 | Epworth et al. | 350/96.19 |
| 4,795,226 | 1/1989 | Bennion et al. | 350/96.15 |
| 4,874,216 | 10/1989 | Utaka et al. | 350/96.19 |

Primary Examiner—John D. Lee
Attorney, Agent, or Firm—Peter R. Ruzek

[57] ABSTRACT

A variable light filtering arrangement includes at least one optical fiber section including a waveguiding core, and at least one permanent Bragg grating region in the optical fiber section. The grating region includes a plurality of grating elements constituted by periodic refractive index variations of a predetermined initial periodicity and cumulatively redirecting, of the light launched into the core for guided propagation therein, that having an axial wavelength within a narrow band around a central wavelength that is determined by the periodicity and refractive index variations of the grating elements. At least one of the periodicity and refractive index variations of the grating region is controlledly modified in such a manner as to temporarily change the central wavelength within a predetermined wavelength range.

20 Claims, 2 Drawing Sheets

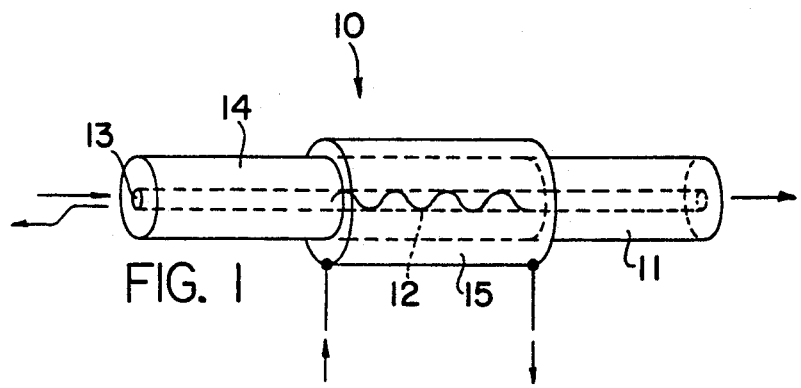
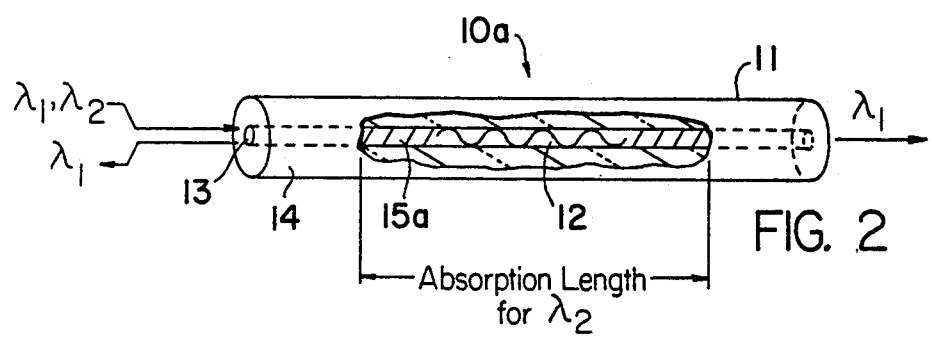
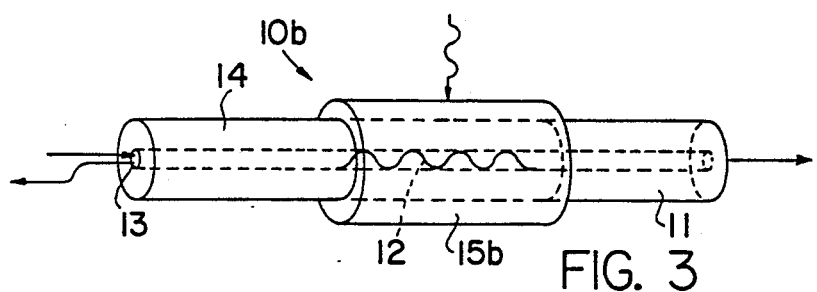
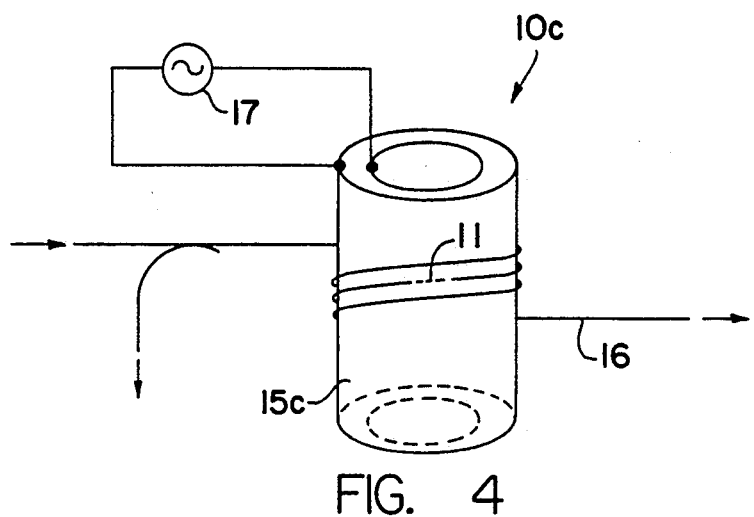

VARIABLE OPTICAL FIBER BRAGG FILTER ARRANGEMENT

DESCRIPTION

1. Technical Field

The present invention relates to optical fiber embedded Bragg gratings in general, and more particularly to arrangements for controlledly modifying the effect of such gratings on light propagating through the optical fiber core.

2. Background Art

There are already known various constructions of optical filters, among them so-called Bragg filters. One type of a Bragg filter, which has been developed for sensing stress and/or temperature changes in structures, is incorporated or embedded in the core of an optical fiber by a method disclosed, for instance, in the commonly owned U.S. Pat. No. 4,807,850. As discussed in this patent, permanent periodic gratings of this kind can be provided or impressed in the core of an optical fiber by exposing the core through the cladding to the interference pattern of two coherent ultraviolet light beams that are directed against the optical fiber symmetrically to a plane normal to the fiber axis. This results in a situation where the material of the fiber core has permanent periodic variations in its refractive index impressed therein by the action of the interfering ultraviolet light beams thereon, with the individual grating elements (i.e. the periodically repetitive regions of the core exhibiting the same refractive index behavior) being oriented normal to the fiber axis so as to constitute the Bragg grating. The embedded Bragg grating of this kind reflects, of the light launched into the fiber core for guided propagation therein in a propagation direction, only that having a wavelength within a very narrow range around a central wavelength that is dependent on the grating element periodicity, back along the fiber axis opposite to the original propagation direction while being substantially transparent to light at wavelengths outside the aforementioned narrow band so that it does not adversely affect the further propagation of such other light. In effect, this type of grating creates a narrow notch in the transmission spectrum and, by the same token, a similarly narrow peak in the reflection spectrum. In the applications for which this kind of Bragg filter has been developed, any stresses or temperature changes encountered at the location of the structure in which the Bragg filter is embedded affect the grating and change its periodicity, or the index of refraction of the material of the core, or both, so that the position of the central wavelength in the spectrum is shifted, thus providing an indication of the stresses or temperature changes existing or taking place in the structure being monitored at the location of the grating.

As advantageous as these Bragg gratings are in the above-mentioned applications, there are other areas which would benefit from the use of such gratings and especially from the wavelength selectivity of narrow band response thereof, but for which these gratings are not suited in the form proposed in the above patent. Such other areas include, for instance, applications in which it is required to tune the Bragg grating stopband to a desired frequency (by correspondingly shifting the central wavelength), or maintain the gating response at the desired frequency, or to scan a frequency range, such as in the optical fiber communication field, in the optical laser frequency control field, and the like.

Accordingly, it is a general object of the present invention to avoid the disadvantages of the prior art.

More particularly, it is an object of the present invention to provide a Bragg filter arrangement which does not possess the disadvantages of the known arrangements of this kind.

Still another object of the present invention is so to develop the filter arrangement of the type here under consideration as to be able to control the optical wavelength or wavelength band to which the Bragg filter is responsive.

It is yet another object of the present invention to devise an arrangement of the above type which is capable of operating at relatively high speeds in response to applied external signals.

A concomitant object of the present invention is to design the arrangement of the above type in such a manner as to be relatively simple in construction, inexpensive to manufacture, easy to use, and yet reliable in operation.

DISCLOSURE OF THE INVENTION

In keeping with these objects and others which will become apparent hereafter, one feature of the present invention resides in a variable light filtering arrangement which includes at least one optical fiber section including a waveguiding core, and at least one permanent Bragg grating region in the optical fiber section. The grating region includes a plurality of grating elements constituted by periodic refractive index variations of a predetermined initial periodicity and cumulatively redirecting, of the light launched into the core for guided propagation therein, that having an axial wavelength within a narrow band around a central wavelength that is determined by the periodicity and refractive index variations of the grating elements. According to the present invention, there is further provided means for so controlledly modifying at least one of the periodicity and refractive index variations of the grating region as to temporarily change the central wavelength within a predetermined wavelength range.

BRIEF DESCRIPTION OF THE DRAWING

The present invention will be described in more detail below with reference to the accompanying drawing in which:

FIG. 1 is a perspective view of an optical fiber section incorporating a Bragg grating in its core and provided with a wavelength modifying device constructed as a highly electrically resistant coating around the grating region;

FIG. 2 is a view similar to that of FIG. 1 but with the modifying device being constituted by a radiation absorptive region of the optical fiber core;

FIG. 3 is another view similar to that of FIG. 1 but showing the modifying device as being constituted by an absorptive external coating on the fiber section;

FIG. 4 is still another view similar to that of FIG. 1 but wherein the modifying device includes a piezoelectric cylinder;

BEST MODE FOR CARRYING OUT THE INVENTION

Figure 5:
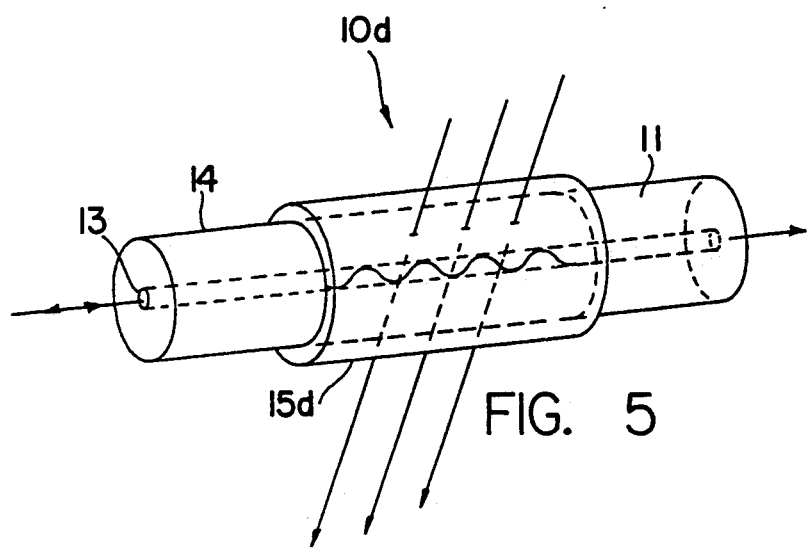
FIG. 5 is a view similar to that of FIG. 1 but showing the modifying device as including an external layer responsive to electric field changes on the fiber section.

Referring now to the drawing in detail, it will be appreciated that the same reference numerals, possibly supplemented with reference characters where appropriate, have been used throughout to identify corresponding parts. Turning first to FIG. 1 as a basis for the following general explanation, it may be seen that the reference numeral 10 has been used therein to identify a variable optical filtering arrangement of the present invention in its entirety. The arrangement 10 includes an optical fiber section 11 that has a Bragg (or periodic) grating 12 embedded therein. The grating 12 may be, and advantageously is, of the type, and made in accordance with the method, disclosed in the commonly owned U.S. Pat. No. 4,807,805 the disclosure of which is incorporated herein by reference to the extent necessary to provide additional explanation of the type of the Bragg grating 12 that is particularly suited for use in the variable optical or light filtering arrangement 10. As more fully explained in the above patent, gratings 12 of this type act as wavelength selective filters. An embedded grating 12 of specified periodicity will partially or wholly reflect or block in transmission a specific wavelength of an optical signal carried by the fiber section 11.

In general, it is proposed in accordance with the present invention to change or shift the reflected or transmission blocked wavelength, by altering the effective spacing of the grating elements or the index of refraction through externally applied forces or actions on the fiber section 12, by an amount that is related to the intensity of the external force or action. As a consequence, the external force or action can be used to tune or adjust the wavelength of the Bragg grating filter 12. By increasing the intensity of the external action, the wavelength of the filter 12 can be scanned. Furthermore, by applying a periodic action, the wavelength of the filter 12 can be modulated. External actions that can change the effective spacing or resonances of the Bragg filter 12 are temperature, mechanical strain (including acoustic and ultrasonic interactions), and electro or magneto optical material effects. The fiber section 11 can also be coated with various materials that can enhance the interaction between the applied action or force and the Bragg filter 12, and thus affect the wavelength tuning, scanning, or modulation. Moreover, by applying a traveling wave action to the fiber section 11 containing the filter 12, a frequency shift can be applied to the optical signal carried in the fiber section 11.

One approach that the present invention takes to varying the Bragg filter wavelength resonances is by changing the temperature, for instance by using an electrical heater, of the fiber section 11 containing the Bragg filter 12. The electrical heating can be accomplished, in a manner that is not illustrated in the drawing, by positioning an external heating element adjacent to the fiber section 11. FIG. 1 depicts an alternative way of varying the temperature and thus the periodicity of the grating 12 which is shown to be embedded in a core 13 of the optical fiber section 11 that is surrounded by a cladding 14. In this case, a high electrical resistance conductive coating 15 is applied directly to the external fiber surface (i.e. to the outer surface of the cladding 14 in the illustrated example), and an electric current is passed through the coating 15. In each instance, the Bragg filter response can be set to and/or maintained at a desired wavelength by employing temperature control and/or stabilization. Alternatively, the filter 12 can be wavelength scanned by ramping the intensity of the electrical heat that is applied to the fiber section 11. Since the thermal mass of the fiber section 11 is small, response times of the filter 12 to temperature changes are in the millisecond range.

Temperature tuning the Bragg filter wavelength can also be accomplished optically by using another light source independent of that emitting the optical signal used to probe or sense the filter 12 and emitting light at a wavelength outside the range of wavelengths over which the Bragg grating 12 can be tuned. As illustrated in FIG. 2, a signal at a wavelength $\lambda_2$ that is spaced in the light spectrum from the filter resonance wavelengths is carried in the fiber core 13 with the filter sensing signal at wavelength $\lambda_1$. A special absorber, such as a rare earth dopant, is placed in the region 15a of the fiber section 11 that contains the grating 12, as indicated by shading. This absorber absorbs light at the wavelength $\lambda_2$, but not at the wavelength $\lambda_1$, and becomes heated thereby. The fiber section 11 can be heated in this manner and consequently the filter 12 can be wavelength tuned by controlling the optical power of the light having the wavelength $\lambda_2$.

The fiber could also be heated using an external optical signal. In the arrangement shown in FIG. 2, this would be accomplished by directing the heating radiation (at the wavelength $\lambda_2$) onto the region 15a in a direction transverse to the longitudinal direction of the fiber section 11, so that this signal passes through the cladding 14 (which in this case is transparent to this radiation) and is absorbed in and thus heats the region 15a with attendant change in the periodicity of and thus in the wavelength effectively reflected by the grating 12. In the alternative, the cladding 14 could contain the aforementioned absorber and thus be heated by the above radiation, or, as shown in FIG. 3 of the drawing, a coating or layer 15b of a material that absorbs the signal having the wavelength $\lambda_2$, or absorbs a broad band of wavelengths such as would be present from thermal radiation sources, is applied to the external surface of the optical fiber section 11 at least around the grating 12. In either case, the filter arrangement 12 could act as a radiation detector (radiometer). When the absorbing element or material is placed in the fiber cladding 14 instead of in the separate layer 15b situated on the surface of the fiber section 11, the absorbing material either would have to be absent from the zone adjacent the fiber core 13, or it would have to be chosen so as not to absorb at the filter wavelengths probed by the $\lambda_1$ signal.

The Bragg filter resonance can also be tuned, in accordance with another aspect of the present invention, by mechanical means with a device that stretches the fiber section 11 at the location of the filter 12. The stretching action or strain would have to remain within the elastic limits of the fiber material. One way to mechanically tune the Bragg filter 12 is to bond or otherwise attach the fiber section 11, at locations that are situated at longitudinally spaced sides of the grating region 12, to a support of a material with a much larger coefficient of thermal expansion than that or those of the fiber section 11. The fiber section 12 would then be mechanically strained by changing the temperature of the system. Yet, such a system would have a larger thermal mass than the fiber section 11 alone (as described above) and consequently have longer response times. On the other hand, the bonded fiber system would be much more sensitive to temperature changes than the bare fiber section 11.

In accordance with another concept of the present invention, the fiber section 11 can be stretched electromechanically using a piezoelectric transducer. One possible utilization of this concept is illustrated in FIG. 4 of the drawing where it may be seen that a piezoelectric cylinder 15c is utilized to stretch a length of an optical fiber 16 that is wound around the circumferential surface of the cylinder 15c and that includes the fiber section 11 having the Bragg grating 12 embedded therein. The fiber 16 is stretched and the wavelength of the Bragg filter 12 is altered accordingly as the cylinder 15c expands with the application of an electrical signal applied to the cylinder 15c and generated by a source 17. One could also use other geometries with piezoelectric elements for tuning the filter 12. For example, a linear stack of piezoelectric elements to which a section of the optical fiber 16 containing the Bragg filter 12 is bonded at each end of the stack can expand the filter under the application of an electric signal to the piezoelectric stack.

Another approach to mechanically affecting the fiber section 11 for wavelength tuning of the grating 12 is to use special coatings on the fiber section 11 over the region of the Bragg filter 12, as shown in FIG. 5 of the drawing. The coating 15d can be sensitive to modulating magnetic fields (e.g. nickel coating), electric fields (e.g. poled $PVF_2$ coating), or acoustic fields. In the case that the coating 15d is sensitive to electric fields, modulation of the Bragg filter 12 could be effective to frequencies of a few hundred MHz utilizing the standing acoustic waves generated in the fiber by the action of the electric field on the coating 15d.

Figure 6:
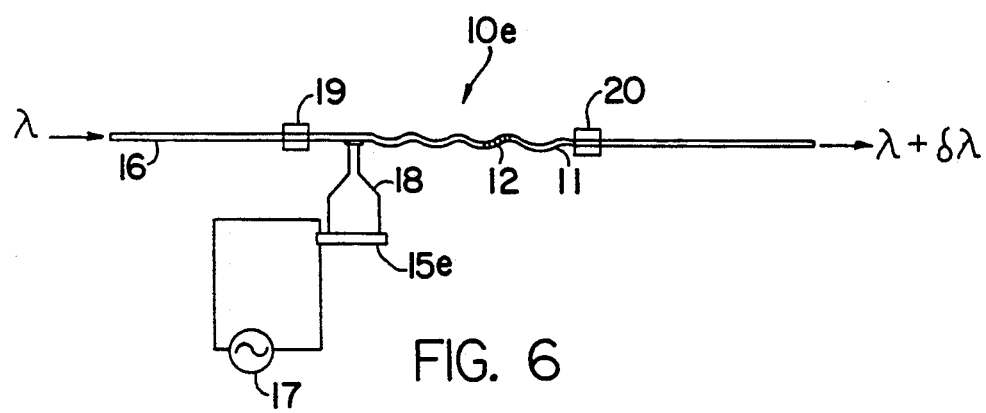
FIG. 6 is a side elevational view of an arrangement including the grating of FIG. 1 but using an acoustic wave applicator as the modifying device.

FIG. 6 illustrates how a traveling wave modulation of the optical signal carried by the fiber 16 can be achieved by passing acoustic flexure waves along the fiber section 11 containing the Bragg filter 12. Such acoustic flexure waves result from the application to the fiber section 11 of acoustic waves generated by a piezoelectric driver 15e driven by an electric source 17 and concentrated by an acoustic horn 18 onto the fiber section 11 which in this instance is mounted between two vibration dampers 19 and 20. This acoustic action shifts the frequency of the optical signal by generating side bands. The thus generated flexure wave travels along the fiber section 11 in the direction of the optical signal and through the Bragg filter 12. Modulation of the filter 12 by the flexure wave also modulates the optical signal. For a flexure wave traveling with the optical signal, the frequency of the optical signal is incremented by the frequency of the flexure wave.

Figure 7:
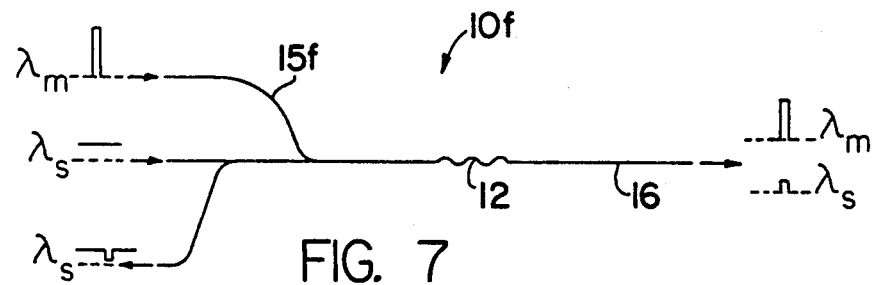
FIG. 7 is side elevational view of an arrangement akin to that of FIG. 1 but utilizing refractive index altering radiation for modifying the wavelength to which the Bragg grating responds.
Figure 8:
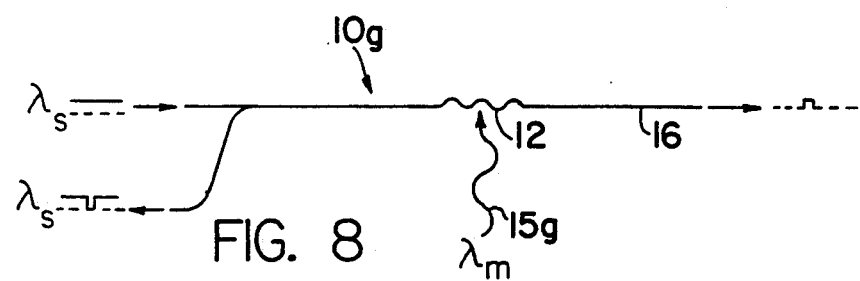
FIG. 8 is a view similar to that of FIG. 7 but showing a modified form of the arrangement depicted therein.

If an intense optical field that is nonresonant with the Bragg filter 12 is applied to the Bragg filter 12, there is obtained modulation of a probe signal resonant with the filter 12. This action will occur if the modulating field is intense enough to produce a nonlinear polarization that temporarily changes the refractive index of the fiber material (mode locked picosecond pulses, for example). The filter 12 can thus be detuned from the probe signal, for instance, by the intense modulating field, and consequently the probe signal is then transmitted through the filter 12. One way of applying the modulating field achieving the above purpose is shown in FIG. 7 of the drawing. As shown there, the intense modulating signal is launched into the fiber 16 containing the Bragg filter 11 and carrying the probe signal, by being coupled into the fiber 16 from another optical fiber 15f. An alternative to the above approach is revealed in FIG. 8 of the drawing where it may be seen that the intense modulation signal is focused onto the Bragg filter 12 through the side of the fiber 16, as indicated by an arrow 15g. In either case the resonant frequency of the filter 12 is slightly altered by the nonlinear effect of the modulating field. In each case the response times of the filter 12 are as fast as the modulating optical field.

Another feature for wavelength tuning would be to apply a spatially varying or gradient force or action along the fiber section 11 at the embedded grating 12. This action would create a variable grating spacing or "chirped" grating 12. The variable spacing would broaden the bandwidth of the Bragg reflection. Thus, the central wavelength of the Bragg reflection can be adjusted, as discussed previously, with a constant action along the fiber section 11 and/or the bandwidth of the Bragg reflection can be varied by using a varying action or component along the fiber section 11.

It is further contemplated in accordance with the present invention to use at least some of the above-discussed approaches in conjunction with gratings of the type revealed in the copending commonly owned U.S. patent application Ser. No. 07/456,450. Such gratings redirected light a given axial wavelength between a first path extending longitudinally of the fiber core and a second path extending through the fiber cladding to the exterior of the fiber. In this case, the periodicity and/or refractive index changes caused by the application of longitudinal stresses to the grating in accordance with the present invention commensurately change the central wavelength of the light that is redirected by the grating from the first into the second path, or vice versa.

In the above approaches, the force or action was applied directly to the section 11 of the fiber 16 containing the embedded grating 12. One can also expand the concept to applying the force or action to a section of fiber between reflecting structures consisting of multiple embedded gratings 12. Two separate gratings 12, for instance, with the same periodicity (or Bragg resonances) act together as a Fabry-Perot etalon with wavelength selective reflectors. Forces or action that affect the optical path in the fiber 16 between the embedded grating reflectors 12 also effects the Fabry-Perot resonances. Therefore, one could wavelength tune, scan, or modulate a much narrower Fabry-Perot resonance within the Bragg reflectance spectrum. Thus, it is to be understood that all references made herein to a filter arrangement containing a Bragg filter, refer not only to a single embedded grating filter 12, but also, by extension, to a more complex multiple grating filter.

While the present invention has been illustrated and described as embodied in particular constructions of optical filtering arrangements, it will be appreciated that the present invention is not limited to these particular examples; rather, the scope of protection of the present invention is to be determined solely from the attached claims.

We claim:

1. A variable light filtering arrangement comprising at least one optical fiber section including a waveguiding core;

at least one permanent Bragg grating region in said optical fiber section, including a plurality of grating elements constituted by periodic refractive index variations of a predetermined initial periodicity and cumulatively redirecting, of the light launched into said core for guided propagation therein, that having an axial wavelength within a narrow band around a central wavelength that is determined by the periodicity and refractive index variations of said grating elements; and means for so applying at least to said grating region of said optical fiber section an external influence that is representative of a parameter other than structural strain as to modify at least one of the periodicity and refractive index variations of said grating region with an attendant change in said central wavelength within a predetermined wavelength range to an extent indicative of the magnitude of said parameter.

2. The variable light filtering arrangement as defined in claim 1, wherein said applying means includes means for imposing longitudinal strains dependent on the magnitude of said parameter to said grating region.

3. The variable light filtering arrangement as defined in claim 2, wherein said imposing means includes a portion of said optical fiber section that is at least substantially coextensive with said grating region and changes its dimensions in response to temperature changes thereof, and means for varying the temperature of said portion of said optical fiber section in dependence on the magnitude of said parameter.

4. The variable light filtering arrangement as defined in claim 3, wherein said portion of said optical fiber section is absorptive of radiation outside said predetermined wavelength range; and wherein said varying means includes means for directing said radiation onto said portion with attendant heating of said portion by said radiation.

5. The variable light filtering arrangement as defined in claim 4, wherein said portion of said optical fiber section is in said core.

6. The variable light filtering arrangement as defined in claim 5, wherein said directing means includes means for launching said radiation into said core for propagation longitudinally thereof.

7. The variable light filtering arrangement as defined in claim 5, wherein said directing means includes means for directing said radiation at least onto said grating region of said core substantially transversely of said optical fiber section.

8. The variable light filtering arrangement as defined in claim 4, wherein said optical fiber section further includes a cladding surrounding said core; and wherein said portion of said optical fiber section is in said cladding.

9. The variable light filtering arrangement as defined in claim 3, wherein said optical fiber section further includes a cladding surrounding said core; wherein said portion of said optical fiber section is constituted by a layer of a material absorptive of radiation of a predetermined wavelength and surrounding said cladding; and wherein said varying means includes means for directing said radiation onto said layer substantially transversely of said optical fiber section with attendant heating of said layer by said radiation.

10. The variable light filtering arrangement as defined in claim 3, wherein said optical fiber section further includes a cladding surrounding said core; wherein said portion of said optical fiber section is constituted by a layer of a material exhibiting a pronounced resistance to the passage of electric current therethrough and surrounding said cladding; and wherein said varying means includes means for causing electric current to flow through said layer with attendant heating of said layer.

11. The variable light filtering arrangement as defined in claim 2, wherein said imposing means includes a portion of said optical fiber section that is at least substantially coextensive with said grating region and changes its dimensions in response to changes in magnetic field applied thereto, and means for varying the magnetic field applied to said portion of said optical fiber section.

12. The variable light filtering arrangement as defined in claim 2, wherein said imposing means includes a portion of said optical fiber section that is at least substantially coextensive with said grating region and changes its dimensions in response to changes in electric field applied thereto, and means for varying the electric field applied to said portion of said optical fiber section.

13. The variable light filtering arrangement as defined in claim 2, wherein said imposing means includes means for applying longitudinally directed forces of opposite directions to portions of said optical fiber section that are situated at opposite longitudinal sides of said grating region.

14. The variable light filtering arrangement as defined in claim 13, wherein said applying means includes a support of a material capable of changing at least one of its dimensions in response to the action of an external influence thereon; wherein said optical fiber section is so attached to said support that said portions thereof are stationary with respect to respective locations of said support that are spaced from one another by a predetermined distance in the direction of said one dimension; and wherein said applying means includes means for subjecting said support to said external influence with attendant change in said dimension and in said predetermined distance.

15. The variable light filtering arrangement as defined in claim 14, wherein said support has a substantially cylindrical configuration and includes a circumferential surface; wherein said one dimension is the circumferential direction of said surface; and wherein said locations are situated on said circumferential surface.

16. The variable light filtering arrangement as defined in claim 15, wherein said optical fiber section is wrapped around said circumferential surface.

17. The variable light filtering arrangement as defined in claim 16, wherein said support is of a piezoelectric material; and wherein said subjecting means includes means for applying an electric potential difference to said support so as to change said one dimension thereof.

18. The variable light filtering arrangement as defined in claim 2, wherein said imposing means includes means for causing mechanical vibrations to propagate longitudinally of said optical fiber section with attendant cyclical changes in the periodicity of said grating elements and in said central wavelength.

19. The variable light filtering arrangement as defined in claim 1, wherein said applying means includes means for selectively directing onto at least said grating region controlling light of such a wavelength and intensity as to temporarily change the refractive index of the material of said core.

20. The variable light filtering arrangement as defined in claim 19, wherein said directing means includes means for launching said controlling light into said core for propagation longitudinally thereof.

* * * * *